Figure 1:
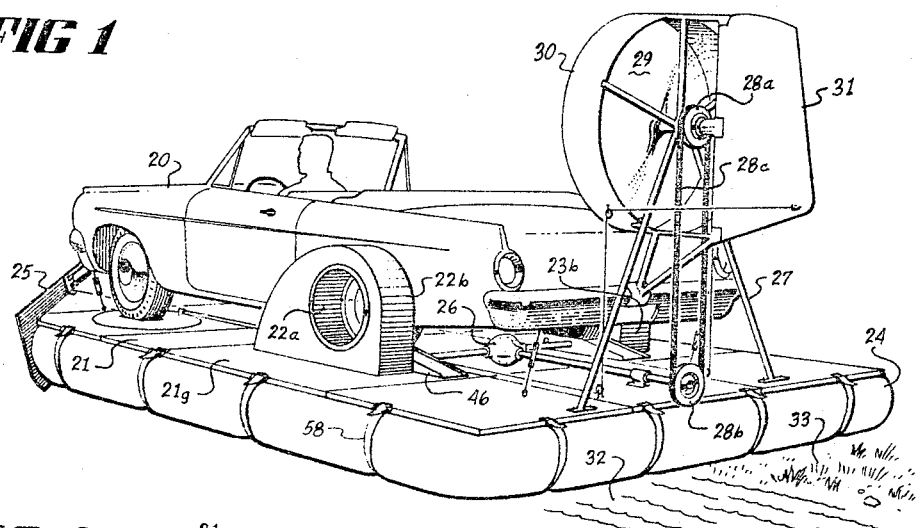

Sept. 6, 1966     P. J. MANTLE     3,270,827

AMPHIBIOUS AUTOMOBILE GEM KIT

Filed May 13, 1963     2 Sheets-Sheet 1

INVENTOR:
PETER J. MANTLE

Sept. 6, 1966     P. J. MANTLE     3,270,827

AMPHIBIOUS AUTOMOBILE GEM KIT

Filed May 13, 1963     2 Sheets-Sheet 2

INVENTOR:
PETER J. MANTLE

United States Patent Office 3,270,827
Patented Sept. 6, 1966

3,270,827
AMPHIBIOUS AUTOMOBILE GEM KIT
Peter J. Mantle, Pasadena, Calif., assignor to Vehicle Research Corporation, Pasadena, Calif.
Filed May 13, 1963, Ser. No. 279,883
4 Claims. (Cl. 180—7)

This invention relates to a Ground Effect Machine, hereinafter referred to as a GEM, and in particular to a kit for temporarily converting an automobile, without structural change thereto, and without additional power plants, into an automobile GEM, and giving to the automobile the capability of translating as an air cushion vehicle above land or water surfaces.

In my Patent 3,211,124 issued October 12, 1965, entitled Automobile GEM Kit, I have disclosed a kit that may be fitted to any conventional automobile to extend its mobility and give it an over-water capability. The present invention extends the mobility of an automobile even further by giving to it the ability to translate above land or water as a GEM. This invention differs from that of my above referenced patent in the manner of propelling and steering the automobile in its GEM role. Some equipment described and claimed in that patent is identical to that described but not claimed herein. Description of that similar equipment is repeated in this application in order that this embodiment of the invention may be explained in its entirety.

Primary objects of the invention are: first, to extend the mobility of an automobile by giving it an over-water capability; second, to extend the mobility of an automobile by giving it the capability of translating above unprepared land surfaces, for example, over sand, mud, snow, or ice; third, to accomplish this with equipment light and compact enough to permit its transportation by the automobile itself; fourth, to use the automobile controls for its operation as an Amphibious Automobile GEM; fifth, to use the power of the automobile to generate the air cushion necessary for operation of the automobile as an amphibious automobile GEM; and sixth, to use the power of the automobile for propulsion of the amphibious automobile GEM.

Secondary objects of the invention are: first, to provide a kit to convert an automobile to an amphibious automobile GEM; second, to provide such a kit so designed that it can be fitted to and removed from an automobile with the limited number and assortment of tools an automobile normally carries; and third, to provide a basic kit that can be supplemented by parts designed for specific automobiles in order that a complete Amphibious Automobile GEM Kit comprising the basic kit and appropriately dimensioned supplemental parts may be fitted to any make of automobile.

With these and other objects in view, the invention comprises the novel organization of principles and the arrangement of parts hereinafter described, and illustrated by the accompanying drawings. It is to be understood, however, that the aforementioned descriptions and drawings do not reduce the scope of the invention from that expressed by the claims hereunto appended.

Of the accompanying drawings, forming part of this specification, in which like reference numerals designate like parts in the several views:

FIGURE 1 is a perspective view of an automobile, representing any conventional automobile whether passenger or freight carrying, equipped with the Amphibious Automobile GEM Kit and translating above water and land surfaces.

Figure 2:
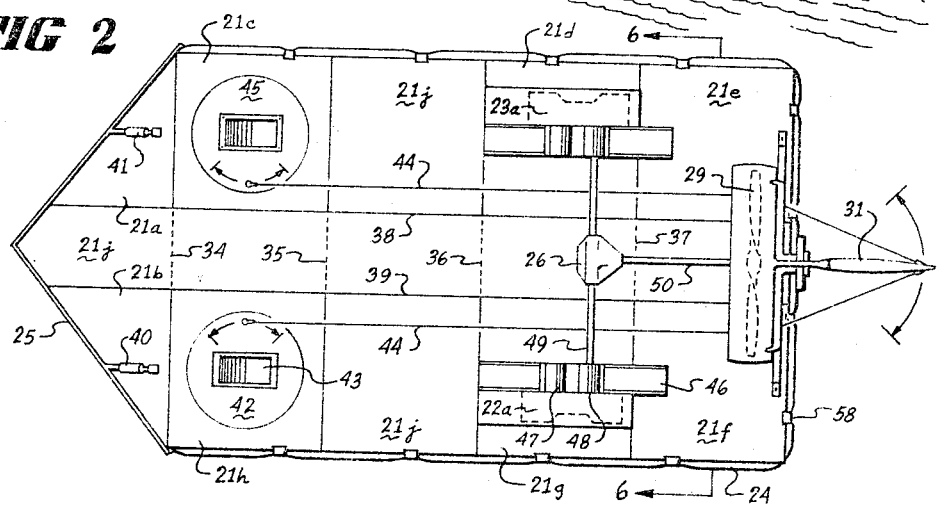
Figure 3:
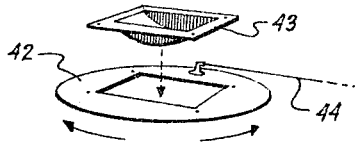
Figure 4:
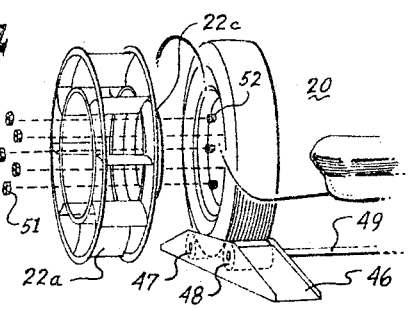
Figure 5:
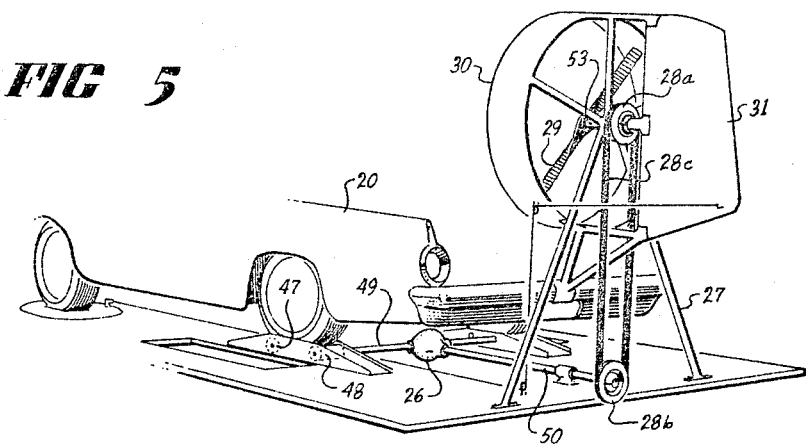
Figure 6:
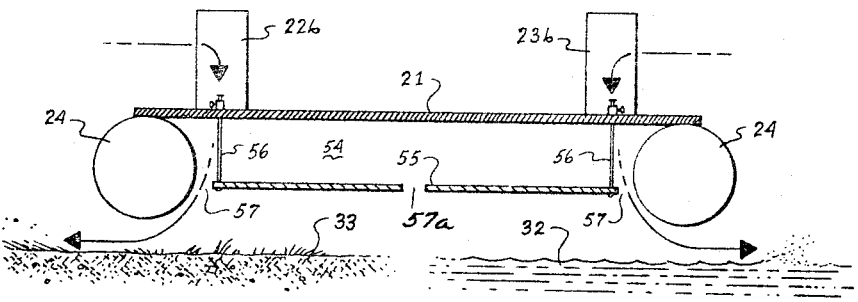
Figure 7:
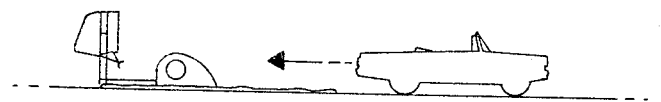
Figures 8, 9:

FIGURE 2 is a plan view of the sectionalized platform to which the automobile is secured during its amphibious automobile GEM role, FIGURE 3 is a perspective view of the left rotatable disc and the cable which leads therefrom to the rudder, FIGURE 4 is a perspective view of the left fan, FIGURE 5 is a perspective view of the air propeller and the mechanism through which the rear wheels of the automobile drive the air propeller, FIGURE 6 is a cross section of FIGURE 2 showing the plenum chamber and the second sectionalized platform, and FIGURES 7, 8, and 9, show in sequence the conversion of the automobile to an amphibious automobile GEM.

Referring now to the drawings and describing this invention in detail, an automobile 20, as shown in FIGURE 1, is fitted with the Amphibious Automobile GEM Kit. Parts of the Amphibious Automobile GEM Kit shown in this view, the function of each to be described, are as follows: a sectionalized platform 21, left fan 22a and right fan housing 23b, inflatable tube 24, wave deflector 25, conventional automobile differential gear 26, propeller support tripod 27, pulleys 28a and 28b, drive belt 28c between pulleys 28a and 28b, propeller housing 30, and rudder 31. In FIGURE 1 the automobile 20 is shown fitted with the Amphibious Automobile GEM Kit and translating above water 32 or land 33.

The sectionalized platform shown in FIGURE 2, referred to in its entirety as 21, comprises the bow sections 21a and 21b, and sections 21c, d, e, f, g, h, and j. Section 21j, the cruciform center section, is one of the specific appropriately dimensioned parts referred to previously. Section 21j is provided in different sizes to vary the overall size of the assembled platform 21 according to the wheelbase of the automobile it is intended to accommodate. All other sections of the sectionalized platform 21, previously enumerated as 21a, b, c, d, e, f, g, and h, are of standard dimensions. The center section 21j is hinged along the lines 34, 35, 36, 37, 38, and 39, in an airtight fashion to be described, to facilitate ease of storage and transportation.

The sectionalized platform 21, in its assembled condition is secured to the inflatable tube 24 by a plurality of straps 58. The wave deflector 25 is secured to the front bumper of the automobile 20 (shown in FIGURE 1) by the adjustable, shock-absorbing mounts 40 and 41. The wave deflector 25 is positioned so that it protects the inflatable tube 24 from heavy wave impact during translation of the amphibious automobile GEM above a water surface 32 as illustrated by FIGURE 1.

Section 21h of the sectionalized platform 21 incorporates a rotatable disc 42. The trough 43, within the rotatable disc 42, accommodates the front left wheel of the automobile 20 (shown in FIGURE 1) for a purpose to be described. The cable 44 is attached to the rotatable disc 42 so that any rotation of the rotatable disc 42 causes a tightening or slackening of the cable 44. The cable 44 is attached to the rudder 31 so that any tightening or slackening of the cable 44 results in a deflection of the rudder 31. The rotatable disc 45, incorporated in section 21c of the sectionalized platform 21, is identical in design and function to the rotatable disc 42. The trough 43 is one of the specific appropriately sized parts referred to previously, provided in different sizes for specific automobiles. That is to say, the trough 43, which can be removed from the rotatable disc 42 in the manner illustrated by FIGURE 3, is varied in width and radius to accommodate the front wheel of any specific automobile.

Section 21g of the sectionalized platform 21 (shown in FIGURE 2), incorporates a ramp 46 to accommodate the left rear wheel of the automobile 20 shown in FIGURE 1. The plan view of FIGURE 2 shows the ramp and the rollers 47 and 48 mounted in the ramp 46. The left rear wheel of the automobile 20 rests on the rollers 47 and 48 so that when the left rear wheel of the automobile 20 is in motion, for a purpose to be described, there is no corresponding forward or rearward movement of the automobile 20. The roller 48 is connected by a shaft 49 to the conventional automobile differential 26 which, in turn, is connected by the shaft 50 to the pulley 28b shown in FIGURE 1. The belt 28c connects the pulley 28b to the pulley 28a which is connected to the air propeller 29 by the shaft 53 shown in FIGURE 5. Section 21d of the sectionalized platform 21 shown in FIGURE 2 is similarly squipped with ramp, rollers and shaft, identical in design and function to those already described. Thus, power from the rear wheels of the automobile 20 is transferred through the linkage described to the air propeller 29.

The left rear wheel of the automobile 20 is fitted with the fan 22a shown in FIGURE 1 and FIGURE 2, for a purpose to be described. The fitting, as illustrated in FIGURE 4, is accomplished by removing the nuts 51 which attach the left rear wheel of the automobile 20 to the bolts 52 of the left axle hub of the automobile 20, and by securing the inner plate 22c to the bolts 52 with the nuts 51. The inner plate 22c of the fan 22a is one of the specific appropriately dimensioned parts referred to previously. That is to say, holes are drilled in the inner plate 22c to correspond to the number and spacing of the bolts 52 of individual automobiles. The housing 22b of the fan 22a, fitted in a detachable manner to the section 21g of the sectionalized platform 21, is of flexible but air tight material, its purpose being to direct pressurized air produced by revolution of the fan 22a through a duct in section 21g of the sectionalized platform 21 to the plenum chamber 54, shown in FIGURE 6, beneath the sectionalized platform 21 for a purpose to be described. The right rear wheel of the automobile 20 is equipped with a fan, and section 21d of the sectionalized platform 21 is equipped with a fan housing, said fan and said fan housing identical in design and function to those previously described.

The manner in which power is transferred from the rear wheels of the automobile 20 to the air propeller 29 is further illustrated by FIGURE 5. The left rear wheel of the automobile 20 is shown resting on the rollers 47 and 48. When the left rear wheel of the automobile 20 revolves, there is a corresponding revolution of rollers 47 and 48. The roller 48 causes the shaft 49 to revolve. The shaft 49 is connected to the conventional automobile differential 26. It can be seen from FIGURE 5 that the conventional automobile differential 26 operates in a reverse manner to its normal application. That is to say, instead of transferring power to the shaft 49, the differential 26 receives power from the shaft 49 and transfers it to the shaft 50. When the shaft 50 revolves it causes a corresponding revolution of the pulley 28b which transfers its power to the pulley 28a by the belt 28c. The pulley 28a, connected to the shaft 53, transfers its power to the air propeller 29, also connected to the shaft 53. The shaft 53 is mounted in the tripod 27 which is affixed in a detachable manner to section 21f and section 21g of the sectionalized platform 21, and to the rear bumper of the automobile 20.

The amphibious automobile GEM is supported on a cushion of air, developed by revolution of the fans 22a and 23a, within the plenum chamber 54 provided by the walls of the inflatable tube 24 and by the sectionalized platform 21. FIGURE 6, a cross section of FIGURE 2, shows the plenum chamber 54, the inflatable tube 24, the sectionalized platform 21, and a second sectionalized platform 55. The sectionalized platform 55 is a supplementary and optional part of the Amphibious Automobile GEM Kit, its function being to convert the operation of the amphibious automobile GEM from a plenum Ground Effect Machine to an annular jet Ground Effect Machine. The second sectionalized platform 55, so shaped that its is slightly smaller than the inner perimeter of the inflatable tube 24, is suspended from the sectionalized platform 21 by a plurality of bolts 56. The bolts 56 maintain the platform 55 at an adjustable level in the proximity of the bottom of the inflatable tube 24. Air pressurized within the plenum chamber 54 by revolution of the fans 22a and 23a is emitted through the gap 57 between the perimeter of the platform 55 and the inflatable tube 24, thus constituting an annular jet. The second sectionalized platform 55 is assembled in such a manner that gaps between its various sections permit the escape of pressurized air from the plenum chamber 54 through linear slots such as 57a, thus providing stability by compartmenting.

Use of the Amphibious Automobile GEM Kit may be described in the following sequence as illustrated by FIGURES 7, 8, and 9. The basic kit is supplemented by the following specifically dimensioned items: the inner plates of the two fans (with holes drilled to accommodate the bolts securing the rear wheels to that particular automobile), the curved troughs to accommodate the automobile's front wheels (the troughs of appropriate width and radius), and the center section of the sectionalized platform (of such shape and dimension that when assembled with the other sections, the complete platform is of an appropriate size for the automobile it is intended to accommodate). The second sectionalized platform is also included in the kit if the operator wishes to operate his Amphibious Automobile GEM on the annular jet principle and thus achieve greater economy. The Amphibious Automobile GEM Kit is taken from its storage place within the automobile and the inflatable tube is laid out on the ground with the sectionalized platform assembled above it. (If it is part of the kit, the second sectionalized platform is placed beneath the top sectionalized platform.) The tripod supporting the propeller and the rudder attached to the tripod is fitted to the assembled platform and the cables from the rotatable discs are attached to the rudder. The differential gear is bolted to the center section of the platform and the shafts which convey power from the drive rollers beneath the rear wheels of the automobile are connected to those rollers. The rear hubcaps of the automobile are removed and the automobile is driven on the platform and secured in the proper position, that is, the front wheels in the curved troughs of the rotatable discs, and the rear wheels on the rollers. The automobile is held in its proper position by turn buckles between the bumpers of the automobile and the platform. The tube is now inflated, and whenever appropriate, the second sectionalized platform is lowered to its proper position by turning the bolts attaching it to the top platform. The wave deflector is secured to the front bumper of the automobile and the fans are bolted to the rear wheels. The forward leg of the propeller support tripod is attached to the rear bumper of the automobile and the belt is placed around the pulley of the drive shaft and the pulley of the propeller. The automobile engine is now started.

When the automobile drive is placed in gear, the rear wheels of the automobile revolve and cause a corresponding revolution of the fans attached to them. There is a resultant flow of air from each fan into the plenum chamber beneath the platform. (The hinges of the top platform, permitting it to be folded, and the joints between its various sections, become airtight when pressure is present in the plenum chamber and impinges on the rubber stripping adjacent to and overlapping every joint.) When there is sufficient pressure in the plenum chamber, the Amphibious Automobile GEM rises above the surface on the cushion of air and moves forward as the result of the propeller's revolution.

The propeller is equipped with a pitch control, preferably electrical, permitting elimination or reversal of thrust while the rear wheels of the automobile continue to revolve and drive the fans providing the air cushion. A conventional electrical jack or terminal is provided on the automobile for engagement with a mating terminal on the kit, enabling the electrical pitch control mechanism in the propeller to be operated by the electrical power system on the automobile. Pitch control devices are well known and therefore not specified herein nor shown in the accompanying drawings. Because of the diversity of such devices available, no means of operating the device from the driver's seat has been described. The independence of operating height and speed of the Amphibious Automobile GEM is a safety feature of the vehicle, in that an increase of height over water, at higher speeds, reduces frequency of wave impact for a given surface state.

Steering of the amphibious automobile GEM is accomplished by deflecting the front wheels of the automobile by normal use of the steering wheel. The corresponding movement of the rotatable discs moves the rudder behind the propeller and causes the amphibious automobile GEM to turn left or right.

Additional safety features of the amphibious automobile GEM are the housing of the air propeller (which effects a power saving by employing the ducted fan principle), and the ability of the vehicle to float on water, supported by the inflatable tube.

Having thus described my invention, what I claim as novel and desire to secure by Letters Patent of the United States is:

1. A kit for temporarily converting an automobile to an Amphibious Automobile Ground Effect Machine, said kit comprising one or more fans for providing a cushion of air beneath said amphibious automobile ground effect machine; means powering said fans with said automobile; an air propeller to provide thrust; means powering said air propeller with said automobile; a sectionalized platform, one section of said sectionalized platform so shaped that in combination with other sections of said sectionalized platform, said sectionalized platform, when assembled, can accommodate any make of automobile with wheels of said automobile fitting into ramps and troughs incorporated in sections of said sectionalized platform; rotatable discs in said sectionalized platform supporting said troughs; connecting means converting rotation of said rotatable discs to movement of a rudder; an inflatable tube so shaped that it conforms to the perimeter of said sectionalized platform, said inflatable tube and said sectionalized platform combining to form a plenum chamber wherein air pressurized by revolution of said fans comingles to support said amphibious automobile ground effect machine on a cushion of air; a second sectionalized platform depending from said first mentioned sectionalized platform, said second sectionalized platform so dimensioned that it forms an annular jet opening between the perimeter of said second sectionalized platform and the inner perimeter of said inflatable tube.

2. A GEM attachment type kit for automobiles comprising:
an inflatable tube which when inflated defines a plenum chamber;
a first platform to be supported by said tube, for supporting an automobile, there being means to couple said platform to said tube;
a second platform suspended from said first platform to define a plenum chamber in between, and to define jet producing openings between said second platform and said tube when inflated;
air propeller means on said first platform for producing thrust for driving said tube with platform;
a power fan disposed to deliver pressurized air into said plenum chamber in between said two platforms to lift said tube with platform and automobile from the ground surface underneath; and
means for coupling the engine of an automobile when supported by said platform to said power fan and to said propeller means.

3. A GEM attachment type kit for automobiles comprising:
an inflatable tube which when inflated defines a plenum chamber;
a platform to be supported by said tube, for supporting an automobile, there being means to couple said platform to said tube;
means underneath said platform to define peripheral jet producing openings adjacent said tube;
an air propeller for producing thrust for driving said tube with platform;
a power fan to deliver pressurized air into said plenum chamber underneath said platform to lift said tube with platform from the surface underneath;
rudder means coupled to said platform;
means for coupling the steering mechanism of an automobile when supported by said platform to said rudder means; and
means for coupling the rear wheels of an automobile when supported by said platform to said propeller and to said power fan.

4. A GEM attachment type kit for automobiles comprising:
an inflatable tube which when inflated defines a plenum chamber;
a first sectionalized platform to be supported by said tube, for supporting an automobile, there being means to couple said first platform to said tube;
a second sectionalized platform underneath said first platform and defining peripheral as well as compartmentalized jet openings for air discharge from said plenum chamber;
an air propeller mounted on said first platform;
a power fan disposed to deliver pressurized air into said plenum chamber in between said two platforms for discharge therefrom through said jet openings to lift said tube with platforms and automobile from ground; and
means for coupling the rear wheels of an automobile when supported by said platform to said air propeller and said fan.

References Cited by the Examiner

UNITED STATES PATENTS

| | | |
|---|---|---|
| 1,450,197 | 4/1923 | Zwickey. |
| 1,484,109 | 2/1924 | Beatty _____ 115—.5 |
| 3,040,688 | 6/1962 | Gram _____ 180—7 |
| 3,066,753 | 12/1962 | Hurley et al. _____ 114—67 X |
| 3,077,174 | 2/1963 | Cockerell _____ 114—67 |
| 3,090,455 | 5/1963 | Crowley _____ 180—7 |
| 3,106,260 | 10/1963 | Bollum _____ 180—7 |
| 3,153,461 | 10/1964 | Bollum _____ 180—7 |
| 3,205,960 | 9/1965 | Sperazz _____ 180—7 |

A. HARRY LEVY, *Primary Examiner.*

MILTON BUCHLER, *Examiner.*

M. A. KLEIN, *Assistant Examiner.*